(12) United States Patent
Valente

(10) Patent No.: US 7,631,188 B2
(45) Date of Patent: Dec. 8, 2009

(54) HIERARCHICAL OPEN SECURITY INFORMATION DELEGATION AND ACQUISITION

(75) Inventor: Luis Valente, Palo Alto, CA (US)

(73) Assignee: TVWorks, LLC, Philadelphia, PA (US)

( * ) Notice: Subject to any disclaimer, the term of this patent is extended or adjusted under 35 U.S.C. 154(b) by 721 days.

(21) Appl. No.: 11/247,601

(22) Filed: Oct. 11, 2005

(65) Prior Publication Data

US 2006/0069913 A1  Mar. 30, 2006

Related U.S. Application Data

(63) Continuation of application No. 09/330,274, filed on Jun. 11, 1999, now abandoned, which is a continuation-in-part of application No. 09/162,650, filed on Sep. 29, 1998, now Pat. No. 6,513,116, which is a continuation of application No. 09/080,571, filed on May 18, 1998, now abandoned.

(60) Provisional application No. 60/046,748, filed on May 16, 1997.

(51) Int. Cl.
  *H04L 9/32* (2006.01)
(52) U.S. Cl. .......................... 713/175; 713/156; 713/2; 726/18; 726/30; 380/232
(58) Field of Classification Search ..................... 713/2, 713/156, 175; 705/77; 726/18, 30; 380/382
See application file for complete search history.

(56) References Cited

U.S. PATENT DOCUMENTS

| | | | |
|---|---|---|---|
| 4,035,835 A | 7/1977 | Poetsch | |
| 4,868,877 A * | 9/1989 | Fischer | 713/157 |
| 5,155,847 A | 10/1992 | Kirouac et al. | |
| 5,224,163 A | 6/1993 | Gasser et al. | |
| 5,373,561 A | 12/1994 | Haber et al. | |
| 5,436,673 A | 7/1995 | Bachmann | |

(Continued)

OTHER PUBLICATIONS

Bussey H E et al: "Service Architecture, Prototype Description, And Network Implications Of A Personalized Information Grazing Service" Multiple Facets of Integration, San Francisco, Jun. 3-7, 1990, Institute of Electrical and Electronic Engineers, pp. 1046-1053, XP000164339 see whole document.

(Continued)

*Primary Examiner*—Emmanuel L Moise
*Assistant Examiner*—Paul Callahan
(74) *Attorney, Agent, or Firm*—Banner & Witcoff, Ltd.

(57) ABSTRACT

The invention provides a method and system for secure data transfer and dynamic definition of trustworthiness of various entities by multiple parties in a hierarchy tree or graph structure. The invention uses digital certificates. Each party in the business hierarchy can control and define various trust information including trustworthiness and delegation authority for the entities it deals with. The ability of a party to redefine or add trust information is controlled by the parties with which it has a relationship that are above it in the hierarchy. Trust vectors and delegation vectors are used to store this information. Each party can add trusted third parties to a security object without compromising the integrity of security objects already issued. A sequence of security objects including digital certificates can be modified without compromising the original digital certificates in those security objects.

15 Claims, 8 Drawing Sheets

Sample Business Hierarchy

U.S. PATENT DOCUMENTS

| | | | |
|---|---|---|---|
| 5,444,861 A | 8/1995 | Adamec et al. | |
| 5,453,779 A | 9/1995 | Dan et al. | |
| 5,495,610 A | 2/1996 | Shing et al. | |
| 5,497,422 A | 3/1996 | Tysen et al. | |
| 5,541,638 A | 7/1996 | Story | |
| 5,621,797 A | 4/1997 | Rosen | |
| 5,642,419 A | 6/1997 | Rosen | |
| 5,659,616 A * | 8/1997 | Sudia | 705/76 |
| 5,680,458 A | 10/1997 | Spelman et al. | |
| 5,752,042 A | 5/1998 | Cole et al. | |
| 5,754,939 A | 5/1998 | Hertz et al. | |
| 5,761,306 A | 6/1998 | Lewis | |
| 5,764,992 A | 6/1998 | Kullick et al. | |
| 5,784,463 A | 7/1998 | Chen et al. | |
| 5,787,172 A | 7/1998 | Arnold | |
| 5,796,840 A | 8/1998 | Davis | |
| 5,796,841 A | 8/1998 | Cordery et al. | |
| 5,808,628 A | 9/1998 | Hinson | |
| 5,809,287 A | 9/1998 | Stupeck, Jr. et al. | |
| 5,850,232 A | 12/1998 | Engstrom et al. | |
| 5,852,665 A | 12/1998 | Gressel et al. | |
| 5,859,969 A | 1/1999 | Oki et al. | |
| 5,867,166 A | 2/1999 | Myhrvold | |
| 5,870,765 A | 2/1999 | Bauer et al. | |
| 5,874,967 A | 2/1999 | West et al. | |
| 5,877,741 A | 3/1999 | Chee et al. | |
| 5,926,624 A | 7/1999 | Katz et al. | |
| 5,936,606 A | 8/1999 | Lie | |
| 5,977,960 A | 11/1999 | Nally et al. | |
| 6,005,574 A | 12/1999 | Herrod | |
| 6,009,363 A | 12/1999 | Beckert et al. | |
| 6,018,768 A | 1/2000 | Ullman et al. | |
| 6,028,583 A | 2/2000 | Hamburg | |
| 6,047,269 A | 4/2000 | Biffar | |
| 6,049,628 A | 4/2000 | Chen | |
| 6,049,835 A | 4/2000 | Gagnon | |
| 6,104,727 A | 8/2000 | Moura et al. | |
| 6,304,974 B1 * | 10/2001 | Samar | 726/10 |
| 6,816,900 B1 * | 11/2004 | Vogel et al. | 709/225 |

OTHER PUBLICATIONS

Wyle M F: A Wide Area Network Information Filter Proceedings International Conference Artificial Intelligence On Wall Street, 9Oct. 1991,pp. 10-15, XP000534152 see whole document.

Lang K: "NewsWeeder: learning to filter news" Machine Learning. Proceedings Of The Twelfth International Conference On Machine Learning, Tahoe City, CA, USA, Jul. 9-12, 1995, San Francisco, CA, USA, Morgan Kaufmann Publishers, USA, pp. 331-339, XP002046557 see whole document.

Rosenfeld L B, et al: "Automatic Filtering Of Internet Postings" Online, vol. 18, No. 3, May 1994, pp. 27-30, XP000616769 see whole document.

Yan T W, et al: "Sift-A Tool For Wide-Area Information Dissemination" Usenix Technical Conference, Jan. 16, 1995, pp. 177-186, XP000617276 see whole document.

* cited by examiner

Sample Business Hierarchy

General Format of X509 Version 3 Certificate

ROOT CERTIFICATE CHAINING

FIGURE 4

SAMPLE OEM RSIO

| OEM Root Certificate (note: For an SP RSIO the entire chain of SP Root Certificates would be included. For an ISP RSIO the ISP Root Certificate would be included.) | | |
|---|---|---|
| (Trusted Entity's Identity) | (Trust Information) | (Delegation Information) |
| Entity_1 Fingerprint | Entity_1 trust information | Entity_1 delegation information |
| Entity_2 Fingerprint | Entity_2 trust information | Entity_2 delegation information |
| ... | ... | ... |
| Entity_m Fingerprint | Entity_m trust information | Entity_m delegation information |
| CA_1 Fingerprint | CA_1 trust information | CA_1 delegation information |
| CA_2 Fingerprint | CA_2 trust information | CA_2 delegation information |
| ... | ... | ... |
| CA_n | CA_n trust information | CA_n delgation information |
| Timestamp | | |
| Signature | | |

FIGURE 5

SAMPLE TRUST/DELEGATION VECTOR

| BIT | DESCRIPTION |
|---|---|
| 0 | CA trusted to issue certificates for SSL clients |
| 1 | CA trusted to issue certificates for SSL servers |
| 2 | CA trusted to issue certificates for SP clients |
| 3 | CA trusted to issue certificates for SP servers |
| 4 | CA trusted to issue certificates for SP system software publishers |
| 5 | CA trusted to issue certificates for SP application software publishers |
| 6 | CA trusted to issue certificates for step-up encryption servers |
| 7 | Entity trusted as OEM, can issue OEM RSIOs |
| 8 | Entity trusted as SP, can issue SP RSIOs |
| 9 | SP server instance |
| 10 | SP system software publisher |
| 11 | Application software publisher |

SCHEMATIC OF HIERARCHICAL SECURITY
INFORMATION OBJECT

HIERARCHICAL OPEN SECURITY INFORMATION DELEGATION AND ACQUISITION

CROSS-REFERENCE TO RELATED APPLICATIONS

This application is a continuation of application Ser. No. 09/330,274, filed Jun. 11, 1999, now abandoned, in the name of inventor Luis Valente, titled Hierarchical Open Security Information Delegation and Acquisition which is a continuation in-part of application of application Ser. No. 09/162,650, filed Sep. 29, 1998, now U.S. Pat. No. 6,513,116, in the name of inventor Luis Valente, titled "Security Information Acquisition", is a continuation of application Ser. No. 09/080,571, filed May 18, 1998, now abandoned, in the name of inventors Luis Valente, Venkatachary Srinivasan, Andreas Atkins and Wei Ling Chu, titled "Security Information Acquisition", which claims priority to Provisional Application Ser. No. 60/046,748, filed May 16, 1997, in the name of inventors Luis Valente, Venkatachary Srinivasan, Andreas Atkins and Wei Ling Chu, titled "Client Server Architecture"; These applications are referred to herein as the "Incorporated Disclosures," and are hereby incorporated by reference as if fully set forth herein. In addition, this application incorporates by reference application Ser. No. 08/770,238, filed Dec. 20, 1996, now U.S. Pat. No. 5,991,799 in the names of inventors Wei Yen and Steven Weinstein, titled "Internet Multiplexer for Broadcast and Other Information".

BACKGROUND OF THE INVENTION

1. Field of the Invention

This invention relates to computer security.

2. Related Art

In a data delivery system, data receivers need to know whether they can trust information they receive from senders. This need is increasing due to the growth of data exchanges and business transactions taking place on the Internet over non-secure communication links.

The growing Public Key Infrastructure ("PKI") provides a way for receivers of data to know whether they can trust information they receive from senders. In the PKI, trusted third parties issue digital certificates ("public key certificates") that attest to the authenticity of the binding of a public key to its owner. These trusted third parties are known as certification authorities "CAs", or sometimes are called "public CAs" if their services are available to the public. These digital certificates are created and used using known encryption and decryption security techniques. Verisign, Inc. is an example of a public CA. Senders obtain a certificate from a CA, and include the certificate with the data they wish to send to the receiver The certificate includes enough information for the receiver to verify that the sender's self-identification is accurate (verification of identity), and that the data was not compromised between the sender and the receiver (validation of contents).

The PKI has the general drawback that digital certificates accepted by the receiver are limited to those from certification authorities that the receiver already trusts. Thus the general problem of providing trust information to the receiver is inherent in the PKI. The trust information required by the receiver can include the identities of trusted senders, for what purpose the senders are trusted, and sufficient information to authenticate messages from the trusted senders.

For instance, Secure Socket Layer ("SSL") is a widely adopted protocol that is used within the PKI for authentication and encryption. To authenticate a message, the client must have enough trust information regarding the digital certificate sent by the SSL server ("server certificate")—at a minimum the client must have an authentic copy of the certificate of the CA who issued the SSL server certificate. However, computers, particularly in the consumer market, have limited resources, including limited nonvolatile storage, to store such information.

A computer administrator must decide which CA's to trust. In the case of personal computers used in homes or small offices, the user may be unsophisticated, lacking in knowledge, or unwilling to make and implement his trust decisions. A common solution is providing a factory-defined set of trust relationships. This makes the security measures transparently available to the user. However it is impractical for inexpensive personal computing devices due to the high cost of nonvolatile memory. In addition this solution provides a static set of trust relationships, and does not provide for updates.

The Incorporated Disclosures provide a method for a computing device to acquire trust information after it is manufactured. These applications disclose the general approach of using Security Information Objects ("SIOs"), with a single Trusted Security Information Provider (or at least a single level of TSIPs) defining the trust relationship for all parties. One drawback of the method disclosed is only the TSIP can issue an SIO. Furthermore, the TSIP must administer all parties's trust information, when the TSIP may only be interested in detailed definition of the trust relationship between the TSIP and its closest business partners. Yet, the TSIP may wish to retain some general control over what other partners can do.

In addition, complex interrelated business relationships exist and are evolving on the Internet, and it is desirable to design a system that will also provide accountability and enforcement of complex business relationships and rules. An example business hierarchy is shown in FIG. 1, and is discussed in detail in the Detailed Description below. Referring to FIG. 1, using the method disclosed in the Incorporated Disclosures, OEM1 and OEM2 would be indistinguishable to ISP1 and ISP2. However, it may be desired to distinguish between OEM1 and OEM2, for instance so that if ISP1 is a client of OEM1, it can be prevented from subscribing to services of OEM2. Or, so OEM2 cannot steal customers of OEM 1.

Accordingly, it would be advantageous for a security system to provide a way for each business party to dynamically provide trust information to its clients based on its own business and security requirements, while centralized control is maintained where desired. The system would be transparent to the end-user, and would be easy to implement.

The invention provides a Hierarchical Open Security Information Delegation and Acquisition System which allows secure and dynamic distribution of security information to multiple clients over non-secure channels. It also allows parties to modify the security information, within boundaries that are set by higher-level parties. Such modification can include adding third-party CAs to the list of entities trusted to issue SSL certificates. It provides a technique for each business party to define its own trust relationships with other entities including public CAs, within the parameters that are hierarchically set.

SUMMARY OF THE INVENTION

The invention provides a method and system for secure data transfer and dynamic definition of trustworthiness of various entities by multiple parties in a hierarchy tree or graph structure. Each party in the business hierarchy can control and define various trust information including trustworthiness and delegation authority for the entities it deals with. The ability of a party to redefine or add trust information is controlled by the parties with which it has a relationship that are above it in the hierarchy. Trust vectors and delegation vectors are used to store this information. Each party can add trusted third parties to a security object without compromising the integrity of security objects already issued.

BRIEF DESCRIPTION OF THE DRAWINGS

FIG. 4 shows a sample Root Security Information Object for an OEM.

FIG. 5 shows sample values given to bits in a trust/delegation vector.

DETAILED DESCRIPTION OF THE PREFERRED EMBODIMENT

Figure 1:
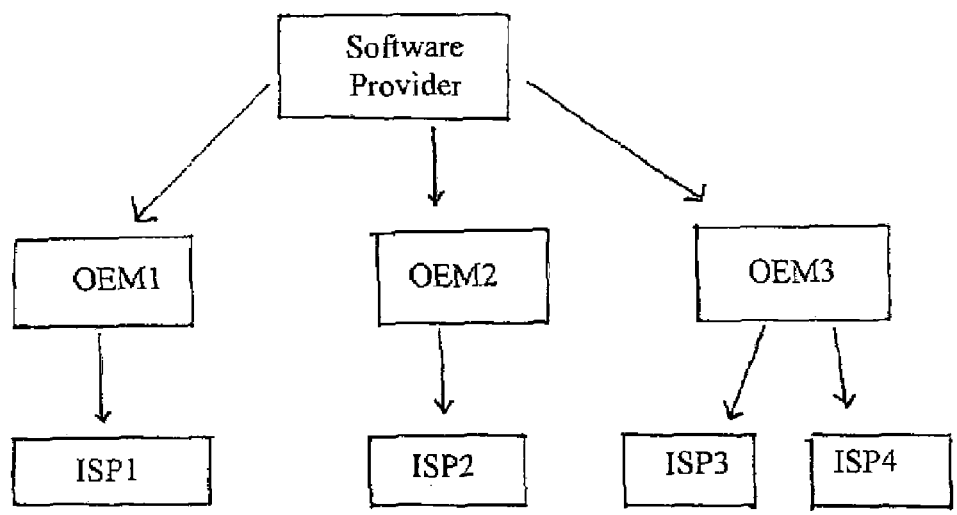
FIG. 1 shows an example business hierarchy.

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Alternative embodiments may use other and further forms of authentication and certification, using other forms of cryptography either in addition to or instead of public key cryptography, and are within the scope and spirit of the invention.

Inventions disclosed herein can be used in conjunction with inventions disclosed in the Incorporated Disclosures, referenced previously.

OVERVIEW OF THE INVENTION

The invention provides a secure and dynamic way of distributing trust information from a centralized authority to parties in a hierarchy that have a relationship with it. Among other things, it provides client with enough information to identify trusted SSL servers and authenticate messages from them. It allows each party to define its own trust relationship with the other business parties in the hierarchy and with other entities, including public CAs, within boundaries that are set hierarchically.

The invention provides a way for the hierarchical structure of business relationships to be incorporated into a security system. The party that is directly above another party in the hierarchy has control over the security information of the lower party—including what kind of third-party entities can be added by the lower party.

A root certificate of the top-level entity in the hierarchy, the Software Provider ("SP") in the preferred embodiment, is preferably stored in non-volatile memory of a computing device at the time of manufacture. Because subsequent SP root certificates are chained together as described in the "Incorporated Disclosures", the computing device can verify any later SP root certificate by chaining back to the one stored in its non-volatile memory. (Or, it can verify by chaining back to a more recent SP root certificate it has stored locally subsequent to time of manufacture.)

Each of the other parties provides its own root certificate to the party directly above it in the hierarchy. The higher party includes a fingerprint of the lower party's root certificate in a digital object, called the Root Security Information Object (RSIO).

Each party can define detailed trust information, including additional trusted third-party public CAs. Each party generates its own RSIO, which it digitally signs and passes to the next higher party in the tree. RSIOs are the basic source of trust information.

For any party in the hierarchy, a path can be traced back to the top level party. Each party in the path has an RSIO. When the RSIOs are chained together, that object is called a Hierarchical Security Information Object (HSIO). The RSIOs of the parties (chained into an HSIO) are able to authenticate by tracing an unbroken path of authentication all the way back to the top of the tree, i.e. the Software Provider in the preferred embodiment. Because the SP's root certificate is locally available to all other parties, it can verify the SP's RSIO and each subsequent RSIO can also be verified, given the structure of the RSIOs, as described below.

DEFINITIONS

A "digital certificate" is a non-forgeable, tamper-proof electronic document that binds an entity's identity to its public key, as is known in the art of public key cryptography. Public key cryptography is discussed in the "Incorporated Disclosures."

A "root certificate" is a self-signed and self-authenticating digital certificate.

An entity's "fingerprint" or "signature" is unique data that another entity can recognize as genuine but cannot duplicate. It can function as a person's fingerprint or signature functions in everyday life. In the preferred embodiment, an entity's fingerprint is a SHA-1 hash of its X.509 version 3 certificate.

A "client" is any computing device that participates in the system, including a classical end-user of a conventional network. Examples of a client are a conventional personal computer or workstation, personal digital assistant, a set-top box, cellular telephone, or digital pager. In discussions of the preferred embodiment the term "client" refers to a set-top box used by a customer of an ISP which could be, for instance, a cable TV service.

A "party" is one of the entities that is authorized to issue RSIOs.

Business Scenario in the Preferred Embodiment

For clarity, the invention is described as applied to a business model in the consumer market, as described below, with the hierarchy having three levels. A sample business hierarchy is shown in FIG. 1.

In the preferred embodiment, the party at the top of the hierarchy is the Software Provider (SP). It provides software that runs on servers and clients of a web-based TV system.

The SP has a business contract with one or more Original Equipment Manufacturers ("OEMs"), for the OEM to manufacture and distribute client and server devices that use SP's software. The OEM is the owner of the hardware (servers and clients that run SP's software) used by the lower levels. The OEM is a large national cable TV company that broadcasts shows. The OEM is the middle level of the hierarchy.

The OEM contracts with one or more Internet Service Providers ("ISPs"). The ISP provides service to individual customers. The ISP also provides its customers with OEM client computers running SP software. The ISP is a small local cable company. The hierarchy can assume many shapes. For example, an ISP may contract with several OEMs, or an OEM may contract with several ISPs.

The invention can be practiced with many other business models. The top-level entity need not be a software provider and need not be affiliated with web-based TV. It can be any entity requiring computer security, including a financial institution, an insurance company, a retail store, a government agency, etc. Likewise, the lower-level entities, if any, can be any entities having a business relationship with the other entities. Currently in the cable television business, it is common for an OEM to also function as the ISP. The business model can have fewer or more than three levels.

Root Certificates

Figure 2:
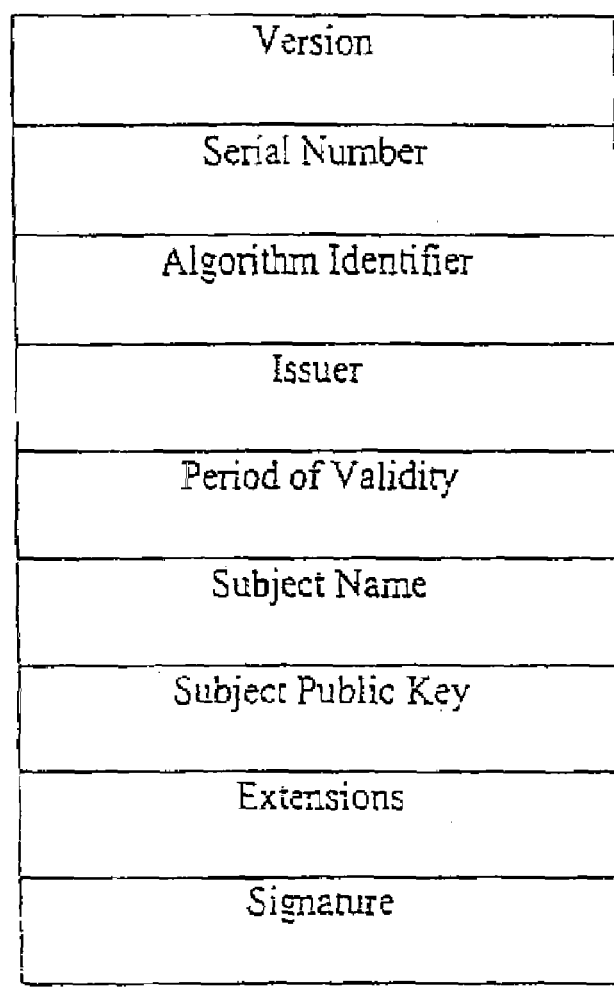
FIG. 2 shows the general format of an X509 version 3 certificate.

Each party in the hierarchy provides a root certificate. The root certificate is preferably in X509 version 3 format. A schematic depiction of this format is shown in FIG. 2. Preferably a period of time for which the certificate is valid is stored in the root certificate in the field that is labeled Period of Validity in FIG. 2. (A party's root certificate is provided to the party immediately above it in the hierarchy. This higher party incorporates the root certificate into the root certificate chain as described below.)

There are three types of root certificates in the preferred embodiment: SP root certificate, OEM root certificate, and ISP root certificate.

Chaining of SP Root Certificate

Figure 3:
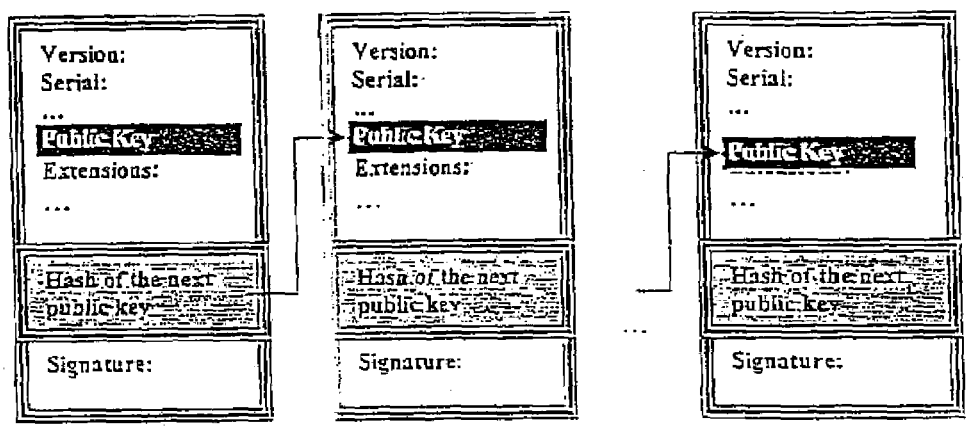
FIG. 3 shows a schematic of root certificate chaining.

Being the top authority, the SP root certificates are chained together as described in the "Incorporated Disclosures." Using this locally stored root certificate, subsequent chained SP root certificates can be verified and validated, as described in the "Incorporated Disclosures." Briefly, root certificate chaining is accomplished by placing, in the current certificate, a digest—obtained by means of a one-way secure hash function—of the public key of the next key pair, i.e. the key pair which will replace the current key pair when the current certificate expires. FIG. 3 illustrates root certificate chaining.

Revocation of the root certificate is accomplished as described in the Incorporated Disclosures.

At the time of manufacture, the most recent and valid root certificate for the SP is stored in nonvolatile memory of the computing device. When an updated SP root certificate is received, the computing device stores this most recent root certificate. (Thus, a later SP root certificate need only be verified to the most recent root certificate that the computing device has previously stored, which saves time.) However, if the client system reverts to its initial operating state (for instance because of a system malfunction resulting in the loss of all data in writable storage), the client will always be capable of verifying a later root certificate using the root certificate that is stored in the computing device's nonvolatile memory at the time of manufacture.

OEM and ISP Root Certificates: Self-Signed and Self-Authenticating

The root certificates of lower level entities (OEM and ISP root certificates in the preferred embodiment) are just like any public CA certificates: they are self-signed and self-authenticating as known in the art of cryptography. They are not chained together. To renew or revoke such a root certificate, the certificate is reissued with new key pairs. Note the higher level party should also remove such a compromised root certificate by removing the root certificate from its RSIO.

Root Security Information Object and Hierarchical Security Information Object

Each party (SP, OEM, ISP) generates its own root security information object (RSIO). A sample RSIO for an OEM is shown in FIG. 4. The RSIO is digitally signed by the entity (preferably, by the entity's current root key pair), and preferably contains a timestamp.

The OEM's RSIO and the ISP's RSIO each contains its current active root certificate. The SP's RSIO preferably contains the SP's entire root certificate chain. That is, referring to FIG. 4 (which shows a sample OEM RSIO), for an SP RSIO instead of merely having the root certificate for the SP, the entire chain of root certificates for the SP is included.

A party's RSIO preferably contains an entry for each entity directly below the party in the hierarchy and can also include a list of the third party CAs that the party trusts. Each trusted entity (preferably either an OEM, ISP, or third party CA) has an entry in the RSIO. Each entity is identified by its fingerprint (to save space).

The trust information for the each trusted entity is given in the RSIO, and is preferably implemented by a vector of bits. The delegation information for each trusted entity is given, and is preferably implemented by a vector of bits.

Trust Vector and Delegation Vector

Each entity has associated with it a trust vector. Each bit in the trust vector designates a role the entity may play. Preferably, some bits in the trust vector indicate things the entity may do. A sample trust/delegation vector is shown in FIG. 5. For example, bit 0 may indicate that the entity is a CA trusted to issue certificates for SSL clients, and bit 1 may indicate that the entity is a CA trusted to issue certificates for SSL servers. There may be different grades of SSL servers governed by different bits.

The trust bits can also indicate what role a Public CA can play. For example, some Public CAs may only be trusted to issue certificates for low-security applications such as personal email, whereas other Public CAs may be trusted to issue certificates for high-security application such as securities trading or electronic funds transfer.

Other bits in the trust vector identify the entity as belonging to a certain class, which is trusted to do certain acts. For instance, bit 2 may indicate that the entity is an OEM (and thus trusted to issue OEM RSIOs) and bit 3 may indicate that the entity is an ISP (and thus trusted to issue ISP RSIOs. Other bits may indicate the entity is one of SP's special business partners such an SP system software publisher, which is trusted to do certain acts.

Preferably, each trusted Entity listed in the RSIO has associated with it a delegation vector. Preferably, each bit in the delegation vector designates whether the corresponding trust vector bit may be turned on by the entity next lowest in the RSIO hierarchy. For instance, the delegation vector in the RSIO for a specific OEM indicates what bits ISPs of that OEM may turn on. This has the effect that an ISP may reduce the trust roles the OEM has assigned an entity (by turning off a trust bit) but may not enlarge the trust roles the OEM has assigned to an entity in the RSIO.

In addition to enabling the OEM to retain control of the changes that an ISP may make, the delegation vector enables the SP to define what authority the OEM or any lower level party has. Thus, the SP can control to some extent what authority all other parties have by being able to prohibit lower entities authority to take certain actions by turning off the delegation vector bit for that action.

Chaining of RSIOs

The RSIO for an entity contains the fingerprints of its children in the hierarchy. The fingerprint is preferably a hash of the root certificate. That is, the OEM's RSIO contains a hash of the ISP's root certificate, and the SP's RSIO contains a hash of the OEM's root certificate.

Figure 6:
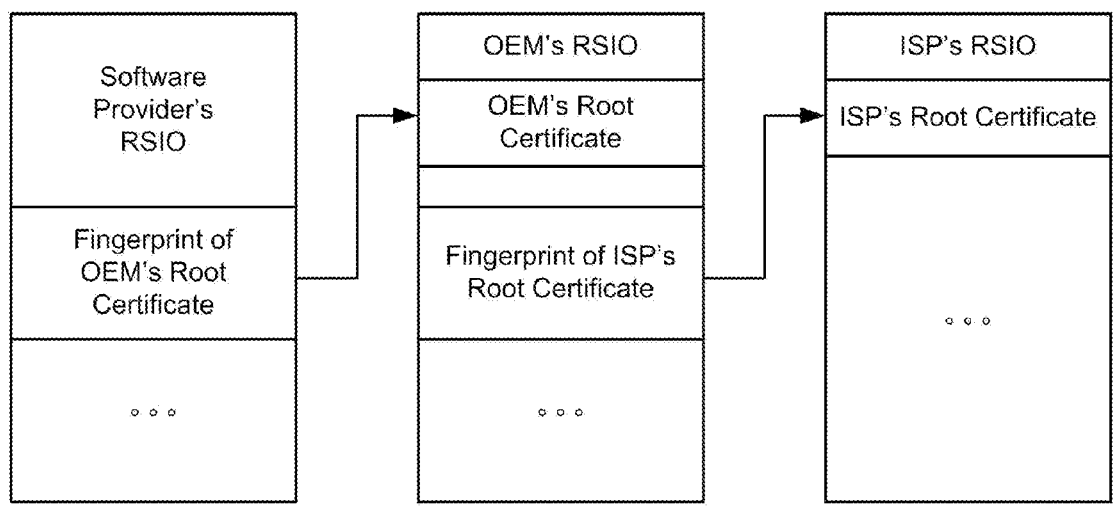
FIG. 6 shows a schematic of how an HSIO chain of RSIOs is linked.

A chain of RSIO's from the SP's RSIO to OEM's RSIO to ISP's RSIO forms a Hierarchical Security Information Object. Preferably the chain is formed using the fingerprint of the root certificate of the next entity in the chain as the link, as shown schematically in FIG. 6. For instance, the SP RSIO can be linked to OEM1's RSIO by matching OEM1's fingerprint in the SP's RSIO to the OEM1 identification in OEM1's RSIO. An SP can make an RSIO for each OEM or can make a single RSIO for several OEMs, or a combination thereof.

HSIO Validation

In the preferred embodiment, the client obtains updated trust information via an HSIO. Before the client relies on the trust information in the HSIO, it must check that the HSIO is genuine and has not been tampered with. An HSIO is a chain of RSIO's from the client back to the SP. In the preferred embodiment, for a client of ISP1, that is an ISP of OEM1, the RSIO chain will consist of SP's RSIO→OEM1's RSIO→ISP1's RSIO.

Figure 7A:
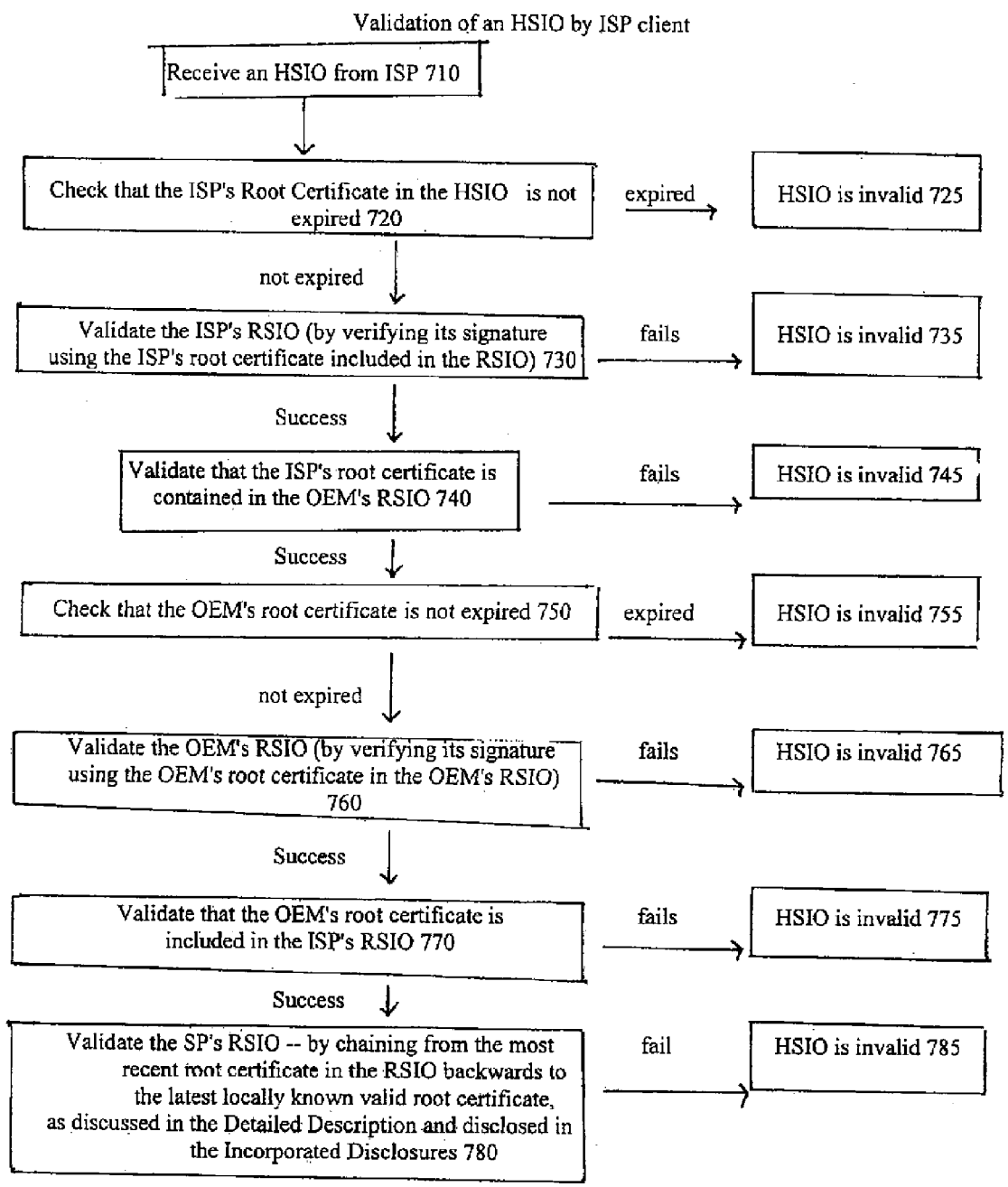
FIG. 7 shows a process flow diagram for a client to validate a Hierarchical Security Information Object.
Figure 7B:
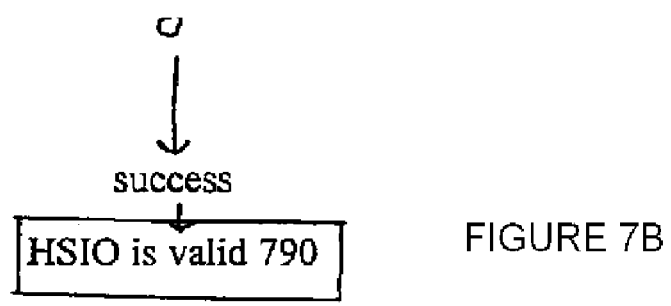

The client can validate the HSIO by the following procedure set out in FIG. 7. First check the validity date of the ISP RSIO against the current date. If it is a valid date, then verify the ISP's RSIO by verifying its signature using the ISP root certificate which is in the ISP RSIO. Check that the ISP fingerprint (hash of its root certificate) is contained in the OEM's RSIO. Check the validity date of the OEM's RSIO, and verify the OEM signature in the OEM RSIO. Check that the OEM fingerprint (hash of its root certificate) is contained in the SP's RSIO. Validate the SP's RSIO by the procedure described in the above and in the Incorporated Disclosures If the HSIO passes the checks set out in the previous paragraph, it is a valid and genuine HSIO.

Update of HSIO

Preferably, the ISP generates new updated HSIOs, because it is the lowest level in the hierarchy, interacting directly with clients. (However, updating of HSIOs can be done by another party.) To generate a new HSIO for a given chain, the ISP needs the current RSIOs of the SP, OEM, and its own RSIO.

Preferably, the client periodically sends the latest timestamp of the three RSIOs in the HSIO (RSIO chain) to the ISP so that the ISP can determine whether a new HSIO should be sent.

Events that trigger generation of a new HSIO are the issuance of a new root certificate by any link in the ISP-OEM-SP chain, and when the trust information in any of the RSIOs has changed.

Example

Verification of a Non-Partner SSL Server

An example use of the invention is set forth here. The SSL protocol is widely used. It may often be desirable for a client to be able to do a transaction with a computer using SSL that is not one of the SP's business partners. For example, a client (cable TV customer) that wants to purchase products over a web-based TV application may need to exchange information with a financial institution SSL server.

The client will receive a server certificate, either signed by a CA or else self-signed, from the third-party server. Suppose server certificate is signed by Verisign as a public CA. The client must determine whether this CA is trusted to issue a server certificate.

In the preferred embodiment, the ISP is delegated authority to designate trusted SSL servers and to designate CAs trusted to sign SSL server certificates (In actual application any specific ISP may or may not have such authority depending on how higher level entities have delegated authority. To check whether an ISP has authority to designate CAs trusted to sign SSL certificates, the trust/delegation vector of the OEM RSIO entry for this ISP would be checked.) In the preferred embodiment, the ISP having authority to designate CAs trusted to do so, the client checks the ISP RSIO to see if Verisign is included as a CA trusted to sign SSL server certificates. (Instead of a CA signing the server certificate, the server certificate may be self-signed, e.g. by Citibank. In such a case, the client checks the ISP RSIO to see whether Citibank is a trusted SSL server.)

If the CA signing the server certificate (Verisign in our example) is not authorized to do so in the ISP RSIO, then the client checks the OEM RSIO to see if Verisign is included as a CA trusted to sign SSL server certificates. (Or, if instead of CA such as Verisign signing, the server certificate is self-signed, e.g. by Citibank, the client checks the OEM RSIO to see that Citibank is a trusted SSL server.)

If no authorization is found in the ISP RSIO or the OEM RSIO, then the SP RSIO is similarly checked. If this check fails, then the client cannot do a transaction with this SSL server.

If authorization is found in any of the RSIOs in the HSIO, then the standard SSL handshake protocol proceeds.

Example

Step-Up Encryption

Using strong encryption internationally is strictly regulated by the U.S. government. However, a trust bit can be designated to control whether a party is not trusted to use strong encryption. Preferably, this trust bit would be turned off in the SP RSIO for computing devices where strong encryption is allowed. The respective delegation bit would also be turned off, so that lower level entities could not enable strong encryption.

Alternative Embodiments

Although preferred embodiments are disclosed herein, many variations are possible which remain within the concept, scope and spirit of the invention, and these variations would become clear to those skilled in the art after perusal of this application.

What is claimed is:

1. A method of securing a computer system of an end user, comprising:
    storing a software provider root security information object in an end user's computer system;
    producing an end user root security information object based on the software provider root security information object;
    receiving security information from a higher-level entity;
    validating the received security information using the end user root security information object; and
    updating the end user root security information object based on validated security information;

wherein the end user root security information object determines one or more trusted entities, determines what functions a trusted entity can perform, and determines who can update the root security information object; and wherein the end user root security information object is controlled by the software provider root security information object; and wherein the computer system refuses information from an entity that is not included in the end user root security information object.

2. The method of claim 1 wherein the end user sends end user security information to the higher-level entity.

3. The method of claim 2 wherein the higher-level entity sends end user security information to a software provider.

4. The method of claim 1 wherein the end user receives security information within a digital certificate.

5. The method of claim 1 wherein the entities the end user can trust include a certification authority.

6. The method of claim 1 wherein the entities the local user can trust include a certification authority.

7. A method of controlling a computer system, comprising:
storing a software provider root security information object in a local computing device;
producing local root security information based on the stored software provider root security information object, wherein said local root security information identifies trusted entities, provides trust information that specifies the roles that the trusted entities can fulfill, and designates who can modify the local root entity information;
receiving updated trust information;
validating the received updated trust information using the local root security information and the software provider root security information object; and
updating the local root security information with the validated trust information,
wherein the local root security information object is controlled by the software provider root security information object; and
wherein the computer system refuses information from art entity that is not included in the local root security information object.

8. The method of claim 7 wherein the local computing device sends local root security information to an upper-level entity.

9. The method of claim 8 wherein the upper-level entity sends local root security information to a software provider.

10. The method of claim 7 wherein the received updated trust information is embedded within a digital certificate.

11. A method of updating trust relationships of users, wherein each computer system of a user includes stored software provider information and stored user root security information, the method comprising:
maintaining an upper level root security information object in a computing device, wherein the upper level root security information object includes information regarding the user root security information of each user and information regarding the stored software provider information; and
sending the computer system of the selected user updated security information;
wherein the sent updated security information is security protected using the stored user root security information of the selected user and the software provider information,
wherein the sent updated security information includes information regarding a trusted entity,
wherein the stored user root security information of the selected user is controlled by the software provider information, and
wherein the computer system refuses in formation from an entity that is not included in the stored user root security information of the selected user.

12. A method of claim 11 wherein the sent updated security information regards a certification authority.

13. A method of claim 11 wherein the sent updated security information is embedded in a digital certificate.

14. A method of claim 13 wherein the digital certificate is in accord with X.509 version 3.

15. A method of claim 11 wherein the sent updated security information is also sent to a software provider.

* * * * *

UNITED STATES PATENT AND TRADEMARK OFFICE
CERTIFICATE OF CORRECTION

PATENT NO.      : 7,631,188 B2                                              Page 1 of 1
APPLICATION NO. : 11/247601
DATED           : December 8, 2009
INVENTOR(S)     : Luis Valente It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this

Second Day of November, 2010

David J. Kappos
*Director of the United States Patent and Trademark Office*